United States Patent
Yoon et al.

(10) Patent No.: US 6,990,149 B2
(45) Date of Patent: Jan. 24, 2006

(54) CIRCUIT AND METHOD FOR FULL SEARCH BLOCK MATCHING

(75) Inventors: Souk-joung Yoon, Seongnam (KR); Young-ro Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 570 days.

(21) Appl. No.: 10/198,448

(22) Filed: Jul. 18, 2002

(65) Prior Publication Data

US 2003/0067986 A1    Apr. 10, 2003

(30) Foreign Application Priority Data

Sep. 19, 2001    (KR)    ................................ 2001-57981

(51) Int. Cl.
*H04N 7/12*    (2006.01)
(52) U.S. Cl. .................. 375/240.24; 382/236
(58) Field of Classification Search .......... 375/240.24, 375/240.16, 240.28; 348/699, 416.1, 420.1; 382/236
See application file for complete search history.

(56) References Cited

U.S. PATENT DOCUMENTS 4,777,530 A * 10/1988 Kondo ...................... 348/699
5,072,293 A * 12/1991 De Haan et al. ............ 348/699
5,400,087 A *  3/1995 Uramoto et al. ............ 348/699

* cited by examiner

*Primary Examiner*—Gims Philippe
(74) *Attorney, Agent, or Firm*—Mills & Onello LLP

(57) ABSTRACT

A circuit and method for full search block matching, capable of quickly calculating the motion vector with lower power consumption, are provided. In the circuit and method for full search block matching, a best matching candidate block is selected by performing a predetermined operation between the reference block pixel data and the candidate block pixel data of a plurality of candidate blocks. The feature of the circuit and method lies in that computation on some pixels can be skipped after determination as to whether to continue or stop the computation on a candidate block. The circuit and method for full search block matching can considerably reduce the number of computations so that the motion vector can be rapidly calculated, saving power.

8 Claims, 8 Drawing Sheets

SEARCH WINDOW

REFERENCE BLOCK

| Cycle Time | INPUT DATA | | | PROCESS INPUTS | | | | | | | |
|---|---|---|---|---|---|---|---|---|---|---|---|
| | τ | s1 | s2 | PE0 | PE1 | PE2 | PE3 | ... | PE15 | PE16 |
| 0 | $T_{0,0}$ | $S_{0,0}$ | | $S_{0,0}$ | | | | ... | | |
| 1 | $T_{0,1}$ | $S_{0,1}$ | | $S_{0,1}$ | $T_{0,0}$ | | | ... | | |
| 2 | $T_{0,2}$ | $S_{0,2}$ | | $S_{0,2}$ | $T_{0,1}$ | $T_{0,0}$ | | ... | | |
| 3 | $T_{0,3}$ | $S_{0,3}$ | | $S_{0,3}$ | $T_{0,2}$ | $T_{0,1}$ | $S_{0,3}$ | ... | | |
| 4 | $T_{0,4}$ | $S_{0,4}$ | | $S_{0,4}$ | $T_{0,3}$ | $T_{0,2}$ | $S_{0,4}$ | ... | | |
| ... | ... | ... | ... | ... | ... | ... | ... | ... | ... | ... |
| 14 | $T_{0,14}$ | $S_{0,14}$ | | $S_{0,14}$ | $T_{0,13}$ | $T_{0,12}$ | $S_{0,14}$ | ... | | |
| 15 | $T_{0,15}$ | $S_{0,15}$ | | $S_{0,15}$ | $T_{0,14}$ | $T_{0,13}$ | $S_{0,15}$ | ... | $T_{0,0}$ | $S_{0,15}$ |
| 16 | $T_{1,0}$ | $S_{1,0}$ | $S_{0,16}$ | $S_{1,0}$ | $T_{0,15}$ | $T_{0,14}$ | $S_{0,16}$ | ... | $T_{0,1}$ | $S_{0,16}$ | $S_{0,16}$ |
| 17 | $T_{1,1}$ | $S_{1,1}$ | $S_{0,17}$ | $S_{1,1}$ | $T_{1,0}$ | $T_{0,15}$ | $S_{0,17}$ | ... | $T_{0,2}$ | $S_{0,17}$ | $S_{0,17}$ |
| ... | ... | ... | ... | ... | ... | ... | ... | ... | ... | ... | ... |
| 30 | $T_{1,14}$ | $S_{1,14}$ | $S_{0,30}$ | $S_{1,14}$ | $T_{1,13}$ | $T_{1,12}$ | $S_{1,14}$ | ... | $T_{0,15}$ | $S_{0,30}$ | $S_{0,30}$ |
| 31 | $T_{1,15}$ | $S_{1,15}$ | $S_{0,31}$ | $S_{1,15}$ | $T_{1,14}$ | $T_{1,13}$ | $S_{1,15}$ | ... | $T_{1,0}$ | $S_{1,15}$ | $S_{0,31}$ |
| ... | ... | ... | ... | ... | ... | ... | ... | ... | ... | ... | ... |
| 240 | $T_{15,0}$ | $S_{15,0}$ | $S_{14,16}$ | $S_{15,0}$ | $T_{14,15}$ | $T_{14,14}$ | $S_{14,16}$ | ... | $T_{14,1}$ | $S_{14,16}$ | $S_{14,16}$ |
| 241 | $T_{15,1}$ | $S_{15,1}$ | $S_{14,17}$ | $S_{15,1}$ | $T_{15,0}$ | $T_{14,15}$ | $S_{14,17}$ | ... | $T_{14,2}$ | $S_{14,17}$ | $S_{4,17}$ |
| ... | ... | ... | ... | ... | ... | ... | ... | ... | ... | ... | ... |
| 254 | $T_{15,14}$ | $S_{15,14}$ | $S_{14,30}$ | $S_{15,14}$ | $T_{15,13}$ | $T_{15,12}$ | $S_{15,14}$ | ... | $T_{15,0}$ | $S_{15,14}$ | $S_{14,30}$ |
| 255 | $T_{15,15}$ | $S_{15,15}$ | $S_{14,31}$ | $S_{15,15}$ | $T_{15,14}$ | $T_{15,13}$ | $S_{15,15}$ | ... | $T_{15,1}$ | $S_{15,15}$ | $S_{14,31}$ |
| 256 | $T_{0,0}$ | $S_{2,0}$ | $S_{15,16}$ | $S_{2,0}$ | $T_{15,15}$ | $T_{15,14}$ | $S_{15,16}$ | ... | $T_{15,2}$ | $S_{15,16}$ | $S_{15,16}$ |
| 257 | $T_{0,1}$ | $S_{2,1}$ | $S_{15,17}$ | $S_{2,1}$ | $T_{0,0}$ | $T_{15,15}$ | $S_{15,17}$ | ... | $T_{15,0}$ | $S_{15,17}$ | $S_{15,17}$ |
| ... | ... | ... | ... | ... | ... | ... | ... | ... | ... | ... | ... |
| 270 | $T_{0,14}$ | $S_{2,14}$ | $S_{15,30}$ | $S_{2,14}$ | $T_{0,13}$ | $T_{0,12}$ | $S_{2,14}$ | ... | $T_{15,14}$ | $S_{15,30}$ | $S_{15,30}$ |
| 271 | $T_{0,15}$ | $S_{2,15}$ | $S_{15,31}$ | $S_{2,15}$ | $T_{0,14}$ | $T_{0,13}$ | $S_{2,15}$ | ... | $T_{0,0}$ | $S_{1,15}$ | $S_{15,31}$ |

CIRCUIT AND METHOD FOR FULL SEARCH BLOCK MATCHING

BACKGROUND OF THE INVENTION

1. Field of the Invention

The present invention relates to motion estimation, and more particularly, to a low-power consumption, fast motion estimation circuit and method for full search block matching.

2. Description of the Related Art

For a television receiver or monitor displaying continuous motion by variations in a predetermined number of non-continuous frames, about 30 frames per second are displayed based on the afterimage effect of human eyes. These 30 successive frames are obtained by dividing a full image signal for 1 second. Data compression/decompression is necessary to display such a large amount of moving picture data on a monitor.

Two successive frames are almost the same with small variations due to motion. Accordingly, after dividing each frame into a plurality of blocks, the frame is checked to determine a location to which an arbitrary block of the current frame moves in the next frame. If only the displacement of the block is expressed as data using the original information of the block of the current frame, the amount of data to be processed can be reduced. For two successive frames, most of the constituent blocks have common data although their positions are changed. Therefore, data can be effectively compressed based on this fact.

As described above, numerically expressing the displacement of an arbitrary block of a frame to a position in the next block is referred to as "motion estimation". In motion estimation, motion information is extracted from a video data sequence. In particular, the previous frame is searched to determine that an arbitrary block (reference block) of the current frame originates from which block (candidate block) of the previous frame. Here, the range of searching for a block in the previous frame, which has the same data as the reference block, is limited. This limited range of searching is referred to as a "search range" or "search window".

Motion vector is a function that defines the position of a candidate block in the previous frame, which is most similar to the reference block. A variety of techniques are available to calculate motion vector. A typical technique is to use the full search block matching algorithm which is most suitable for motion estimation in H.26X and MPEG-1/2/4 video encoding. However, the full search block matching algorithm needs a number of computations and thus increases the processing time.

Figure 1:
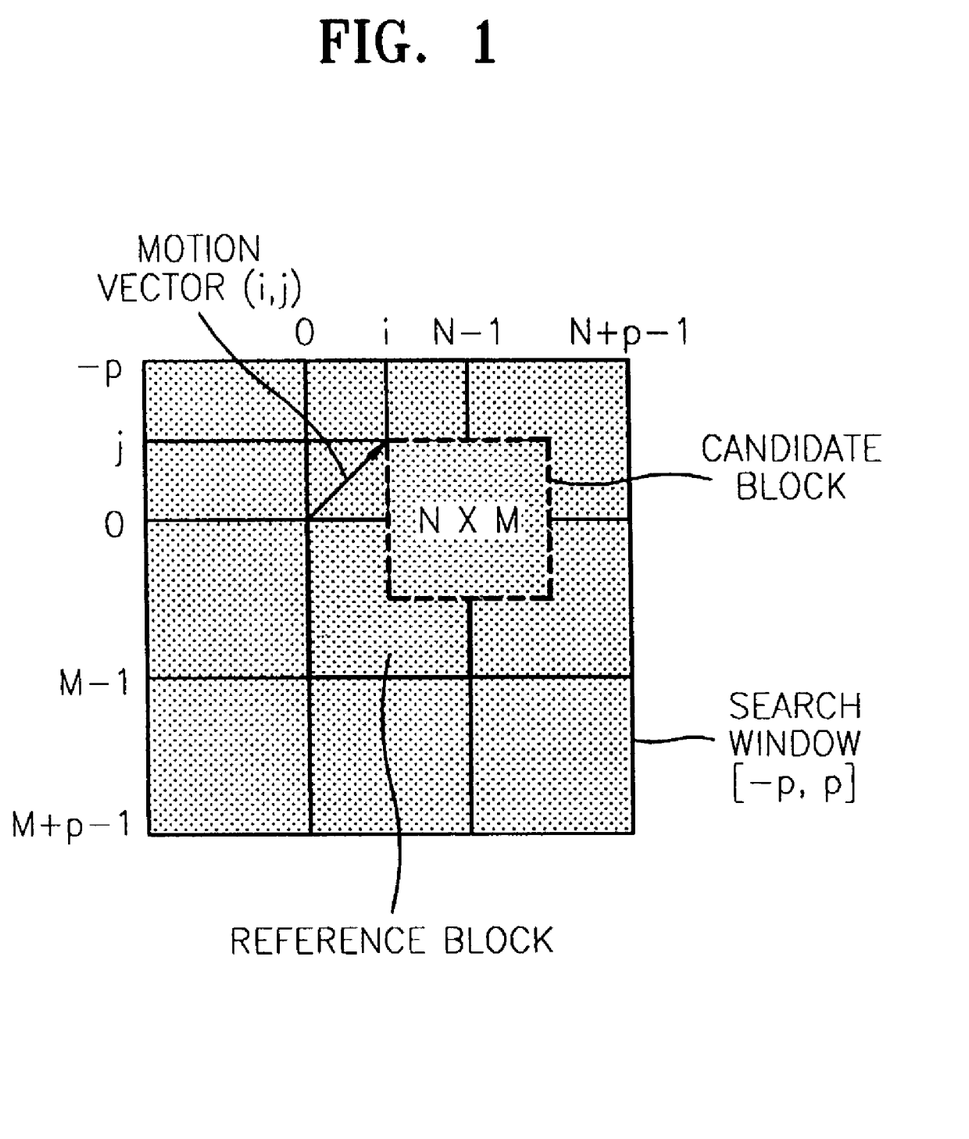
FIG. 1 shows a search window in the range of [−p,p].

FIG. 1 shows a search window [−p, p]. Referring to FIG. 1, among candidate blocks in an arbitrary search window for block matching with a reference block, when a candidate block displaced from the reference block by i (i is an integer) along the X-axis and by j (j is an integer) along the Y-axis, i.e., best matches with the reference block, which has a minimum accumulated absolute difference (AAD) value. The reference block has a motion vector of (i, j) with respect to the previous frame. If the search window ranges in [−p, p], the number of candidate blocks for the reference block is equal to $(2p+1)^2$ in the search window. The function to calculate the AAD value is given by formula (1):

$$AAD(m,n) = \sum_{i=0}^{N-1} \sum_{j=0}^{M-1} |X_{i,j} - Y_{(i+m),(j+n)}|, m, n \in [-p, p] \quad (1)$$

Motion vector can be expressed as follows using the AAD function of formula (1) above:

$$mv(m,n) = \min AAD(m,n) \quad (2)$$

In formula (1) above, X denotes a macro block (i.e., reference block) of the reference frame, and Y denotes a macro block (i.e., candidate block) of the previous frame. To search for the most similar candidate block to the reference block of the reference frame, an accumulated absolute difference between data of a plurality of pixels composing the reference block and data of a plurality of pixels comprising each candidate block in the search window is calculated, and a candidate block having a minimum accumulated absolute difference is selected as the most similar candidate block by using the motion vector.

In general, an SIF image consists of 330 (=22×15) macro blocks each of which includes 16×16 (=N×M) pixels. Supposing that the search window for each macro block is [−p, p], a total of $(2p+1)^2$ AADs is required to calculate the motion vector of each macro block. Each AAD value is calculated by accumulating absolute difference values between the reference block pixel data and the corresponding candidate block pixel data, wherein each block has N×M pixel values. The position of a candidate block in the search window, which has the minimum AAD among the resulting AADs, is defined as a motion vector.

To calculate the motion vector of one macro block, a number of computations are needed, as described by formula (1) above. Therefore, to provide a compressed video image in real time, considerable processor elements (PEs) are required for parallel processing.

SUMMARY OF THE INVENTION

To solve the above-described problems, it is a first object of the present invention to provide a circuit for full search block matching, capable of quickly calculating a motion vector through fewer computations.

It is a second object of the present invention to provide a method for full search block matching, by which a motion vector can be quickly calculated through fewer computations.

In accordance with a first aspect of the present invention, there is provided circuit for full matching a plurality of candidate blocks in a search window with a reference block, the circuit comprising: an address generator, a reference block memory, a search window memory, a processor element unit, a comparison unit, and a logic circuit. The address generator generates a first address signal and a second address signal according to an address skip signal. The reference block memory stores a plurality of reference block pixel data composing the reference block, and outputs the reference block pixel data that are stored, in response to the first address signal. The search window memory stores a plurality of candidate block pixel data in two separate sub-regions of the search window memory, and outputs the candidate block pixel data that are stored, from each of the sub-regions in response to the second address signal. The processor element unit includes a plurality of processor elements which each receive a control signal, the reference block pixel data, and the candidate block pixel data, and calculates and accumulates absolute differences between the reference block pixel data and the corresponding candidate block pixel data to output an accumulated absolute difference (ADD) value for all of the reference block pixel data. The comparison unit receives a predetermined minimum AAD value and the AAD values sequentially output from the processor element unit, compares the minimum AAD value with each of the AAD values and outputs the control signal for each of the processor elements, the control signal controlling whether to enable or disable the corresponding processor element performing AAD value computation. The logic circuit receives the control signals and outputs the address skip signal according to the logic state of the control signals.

In accordance with a second aspect of the present invention, there is provided a method for full matching a plurality of candidate blocks in a search window with a reference block by parallel operation, the method comprising: (a) setting a minimum accumulated absolute difference (AAD) value; (b) calculating and accumulating absolute differences between a plurality of reference block pixel data composing the reference block and corresponding candidate block pixel data composing one candidate block, terminating the absolute difference calculation and accumulation for the candidate block if a current AAD value is greater than the minimum AAD value, and updating the minimum AAD value by a calculated AAD value if the AAD value calculated for all of the pixel data of the candidate block is smaller than the minimum AAD value; (c) determining whether step (b) is performed on all candidate blocks composing one stage, and performing step (b) on the next candidate block of the stage if step (b) is not performed on all of the candidate blocks of the stage; (d) if it is determined in step (c) that step (b) is performed on all of the candidate blocks of the stage, determining whether step (b) is performed on all stages to be searched, each of the stages comprising a plurality of candidate pixels, and performing step (b) if step (b) is not performed on the last candidate block of the last stage; and (e) if it is determined in step (d) that step (b) is performed on the last candidate block of the last stage, terminating the overall process.

DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 8 shows a conventional timetable applied to compute 17 distortions using 17 Pes.

FIG. 9 shows a timetable applied to compute 17 distortions using 17 PEs according to the present invention.

DETAILED DESCRIPTION OF THE INVENTION

Figure 2:
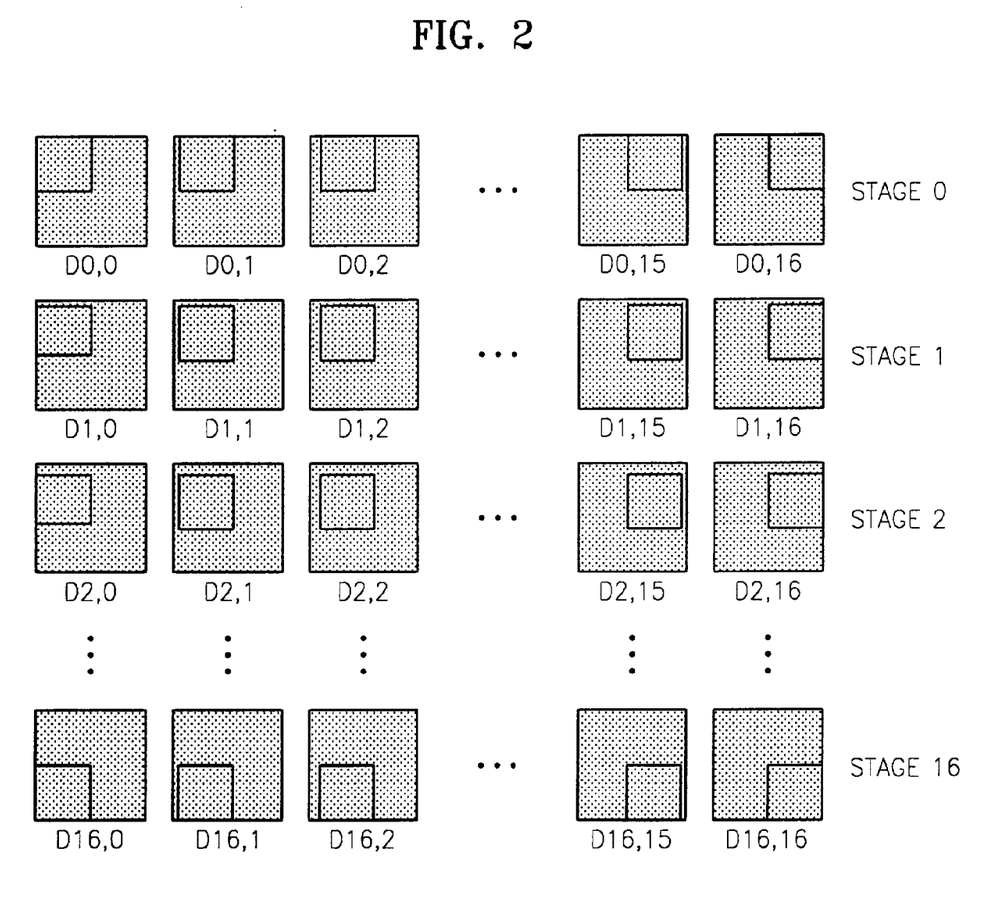
FIG. 2 shows parallel stages according to the arrangement of distortions.

FIG. 2 shows parallel stages according to the arrangement of distortions. Referring to FIG. 2, the distortion array structure comprises a total of 17 stages (stage 0 through stage 16) which each includes 17 candidate blocks. In an actual system, each stage is obtained by shifting a reference block in the direction of the X-axis by as many as 16 pixels, one pixel at a time. The stage extends up to a total of 17 stages in the direction of the Y-axis. For each stage, a total of 17 calculations, i.e., to obtain $D_{0,0}$, $D_{0,1}$, ... $D_{0,15}$, and $D_{0,16}$, are performed so that 289 (=17×17) calculations are performed for all of the stages. Here, $D_{i,j}$ denotes an accumulated absolute difference (AAD) for the candidate block whose left uppermost corner has a coordinate value of (i, j).

Figure 3:
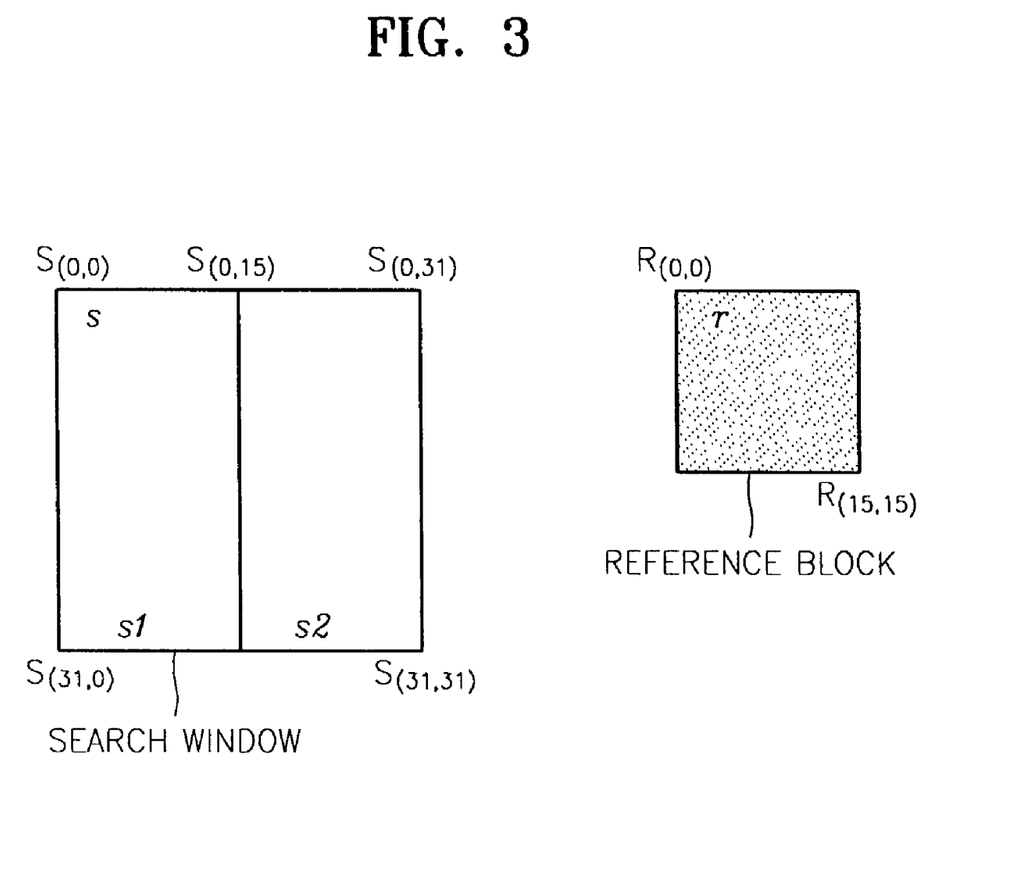
FIG. 3 shows a reference block and a search window.

FIG. 3 shows a reference block and a search window. Referring to FIG. 3, the reference block "r" consists of 16×16 pixels, and the search window "s" ranges in [−p, p] where p=8. The search window including the candidate blocks for the reference block extends 16 pixels in both directions on the X-axis and 16 pixels in both directions on the Y-axis, with respect to the reference block.

To increase processing efficiency by using multiple processors, the search window "s" is divided into two sub-regions "s1" and "s2". During the block matching, each pixel data of the four corners $S_{0,0}$, $S_{0,31}$, $S_{31,0}$, and $S_{31,31}$ is used to calculate only one AAD value. However, the other pixel data are used to generate 16 AAD values for each pixel. For example, a pixel $S_{0,15}$ is used to generate 16 AAD values, $D_{0,0}$, $D_{0,1}$, ..., and $D_{0,15}$. By parallel processing the pixel data of the candidate blocks using multiple processors, multiples AADs can be simultaneously obtained.

Figure 4:
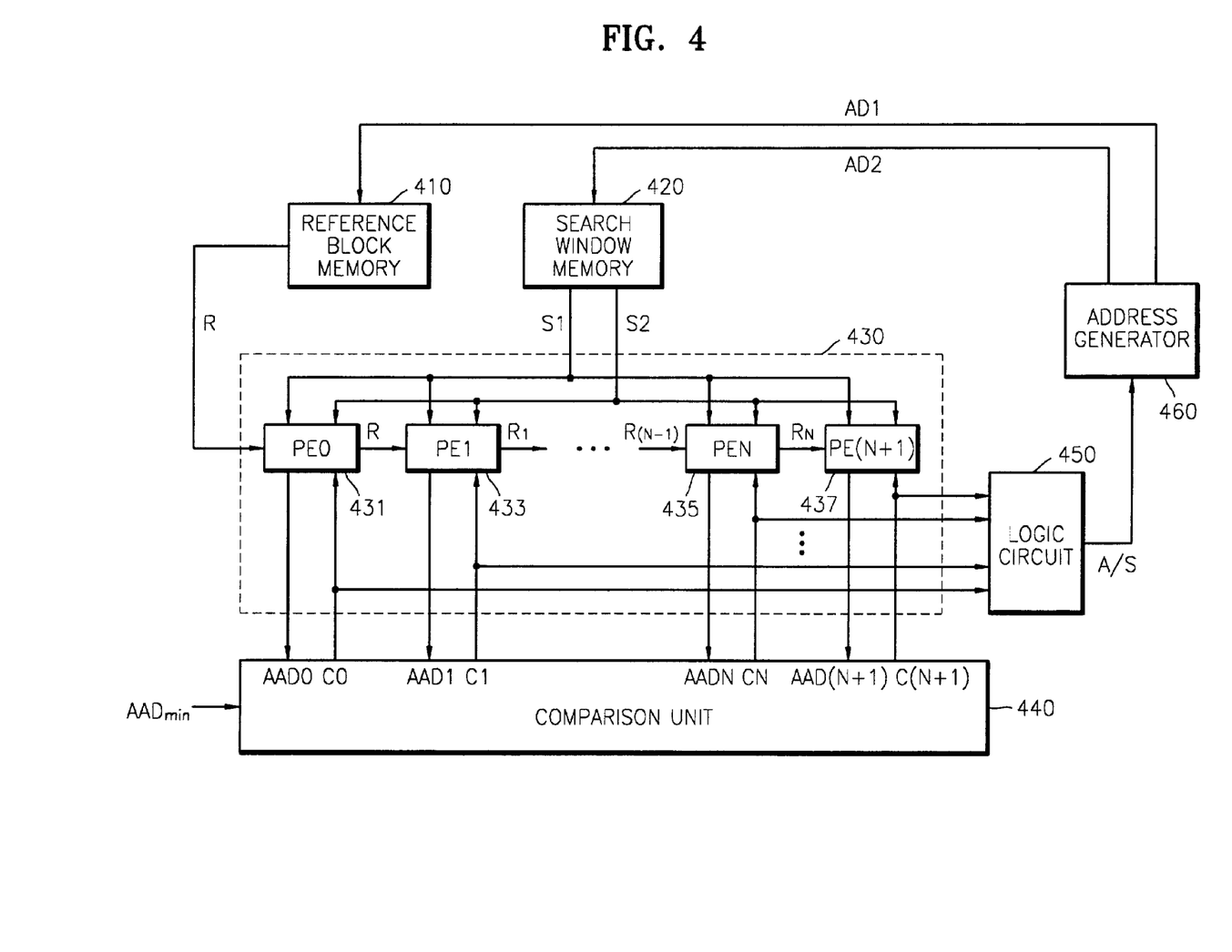
FIG. 4 is a block diagram of a circuit for full search block matching according to an embodiment of the present invention.

FIG. 4 is a block diagram of a circuit for full search block matching according to the present invention. Referring to FIG. 4, the circuit for full search block matching includes a reference block memory 410, a search window memory 420, a processor element (PE) unit 430 including a plurality of PEs, a comparison unit 440, a logic circuit 450, and an address generator 460.

The reference block memory 410 stores data of a plurality of pixels composing a reference block (not shown) and outputs the stored reference block pixel data R in response to a first address signal AD1. The search window memory 420 stores data of a plurality of pixels composing each candidate block of two sub-regions, which are divided from one search window, and outputs candidate block pixel data S1 and S2 from the two sub-regions, respectively.

The PE unit 430 includes a plurality of processor elements 431, 433, ..., 435, and 437, which each receives the reference block pixel data R and the candidate block pixel data S1 and S2, and calculates absolute differences between the reference block pixel data R and either of the candidate block pixel data S1 or S2 according to the corresponding control signal among the control signals C0 through C(N+1).

The first PE 431 receives the reference block pixel data R, the candidate block pixel data S1 and S2, and a first control signal C0, and outputs a first delayed reference block pixel data $R_0$, which is delayed by a predetermined period of time with respect to the reference block pixel data R. The first PE 431 calculates and accumulates absolute differences between the reference block pixel data R and the candidate block pixel data S1 or S2 according to the first control signal C0 to output a first accumulated absolute difference value AAD0.

The second PE 433 receives the first delayed reference block pixel data $R_0$, the candidate block pixel data S1 and S2, and a second control signal C1, and outputs a second delayed reference block pixel data $R_1$, which is delayed by a predetermined period of time with respect to the first delayed reference block pixel data $R_0$. The second PE 433 calculates and accumulates absolute differences between the first delayed reference block pixel data $R_0$ and the candidate block pixel data S1 or S2 according to the second control signal C1 to output a second accumulated absolute difference value AAD1.

The $(N+1)^{th}$ PE 435 receives an $N^{th}$ delayed reference block pixel data $R_{N-1}$, the candidate block pixel data S1 and S2, and an $(N+1)^{th}$ control signal CN, and outputs an $N^{th}$ delayed reference block pixel data $R_N$, which is delayed by a predetermined period of time with respect to a delayed reference block pixel data $R_{N-1}$. The $(N+1)^{th}$ PE 435 calculates and accumulate absolute differences between the $N^{th}$ delayed reference block pixel data $R_{N-1}$, and the candidate block pixel data S1 or S2 according to the $(N+1)^{th}$ control signal CN to output a $(N+1)^{th}$ accumulated absolute difference value AADN.

The $(N+2)^{th}$ PE 437 receives the delayed reference block pixel data $R_N$, the candidate block pixel data S1 and S2, and an $(N+2)^{th}$ control signal C(N+1), and calculates and accumulates absolute differences between the delayed reference block pixel data $R_N$ and the candidate block pixel data S1 or S2 according to the $(N+2)^{th}$ control signal C(N+1) to output a $(N+2)^{th}$ accumulated absolute difference value AAD(N+1).

The comparison unit 440 receives a predetermined minimum AAD value $AAD_{min}$ and a plurality of accumulated absolute difference values AAD0 through AAD(N+1), which are sequentially output from the PE unit 430, and compares the minimum AAD value $AAD_{min}$ with the respective AAD values AAD0 through AAD(N+1) to output the control signals C0 through C(N+1) which determine whether to enable or disable the corresponding PE calculating an AAD value. The logic circuit 450 receives the plurality of control signals C0 through C(N+1) and outputs an address skip signal A/S according to the logic state of the control signals C0 through C(N+1). The address generator 460 generates the first address signal AD1 and the second address signal AD2 according to the address skip signal.

Figure 5:
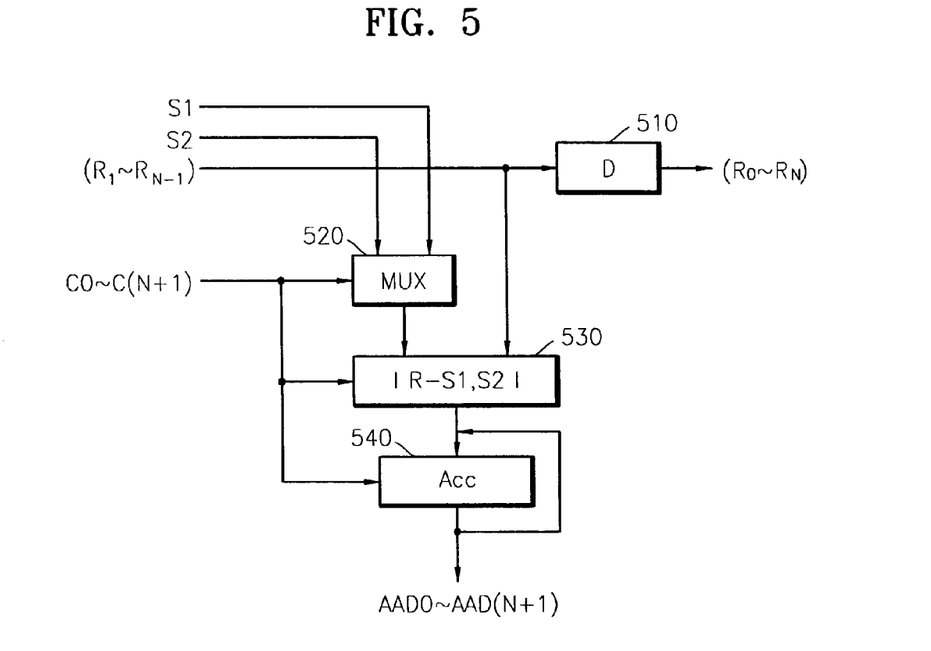
FIG. 5 is a block diagram of one processor element (PE) for a PE unit of FIG. 4.

FIG. 5 is a block diagram of one of the PEs composing the PE unit 430 of FIG. 4. As shown in FIG. 5, each PE includes a D flip-flip 510, a multiplexer 520, an absolute difference calculator 530, and an accumulator 540.

The D flip-flop 510 receives a reference block pixel data R and outputs a first delayed reference block pixel data $R_0$, which is delayed by a predetermined period of time with respect to the reference block pixel data R, or receives the first delayed reference block pixel data $R_0$ and outputs a second delayed reference block pixel data $R_1$, which is delayed by a predetermined period of time with respect to the first delayed reference block pixel data $R_0$. Generally, the D flip-flop 510 receives an $N^{th}$ delayed reference block pixel data $R_{N-1}$, and outputs an $(N+1)^{th}$ delayed reference block pixel data $R_N$, which is delayed by a predetermined period of time with respect to the $N^{th}$ delayed reference block pixel data $R_{N-1}$. However, the $(N+2)^{th}$ PE, which is the last PE of the PE unit 430, does not have the D flip-flop 510 and thus it does not output a signal delayed by a predetermined period of time with respect to the $(N+1)^{th}$ delayed reference block pixel data $R_N$.

The multiplexer (MUX) 520 selectively outputs the candidate block pixel data S1 or S2. The absolute difference calculator 530 calculates absolute differences between the reference block pixel data R, $R_0$, . . . , or $R_{N-1}$ and the candidate block pixel data S1 or S2 output from the multiplexer 520. The accumulator 540 accumulates the output data of the absolute difference calculator 530 until the absolute differences for all of the pixel data of the corresponding candidate block for the reference block are received, and outputs the accumulated absolute difference value AAD0, AAD1, . . . , or AAD(N+1).

When any of the control signals C0 through C(N+1) that is disabled is applied to a PE, the multiplexer 520, the absolute difference calculator 530, and the accumulator 540 in the PE stop performing operations.

Figure 6:
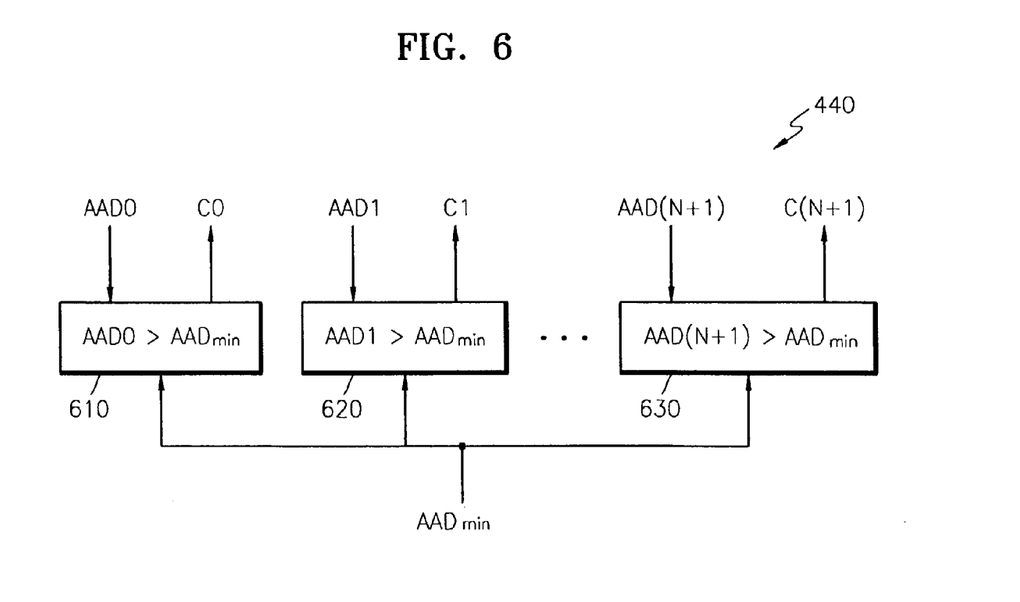
FIG. 6 is a block diagram of a comparison unit of FIG. 4.

FIG. 6 is a block diagram of the comparison unit 440 of FIG. 4. Referring to FIG. 6, the comparison unit 440 includes a first comparator 610 through an $(N+2)^{th}$ comparator 630.

The first comparator 610 receives and compares the minimum AAD value $AAD_{min}$ and the first AAD value AAD0. If the first AAD value AAD0 is greater than the minimum AAD value $AAD_{min}$, the first comparator 610 disables the first control signal C0. The second comparator 620 receives and compares the minimum AAD value $AAD_{min}$ and the second AAD value AAD1. If the second AAD value AAD1 is greater than the minimum AAD value $AAD_{min}$, the second comparator 620 disables the second control signal C1. The $(N+2)^{th}$ comparator 630 receives and compares the minimum AAD value $AAD_{min}$ and the $(N+2)^{th}$ AAD value AAD(N+1). If the $(N+2)^{th}$ AAD value is greater than the minimum AAD value $AAD_{min}$, the $(N+2)^{th}$ comparator 630 disables the $(N+2)^{th}$ control signal C(N+1).

The first comparator 610 through the $(N+2)^{th}$ comparator 630 stop performing comparisons if the corresponding control signal C0, . . . , or C(N+1) is disabled.

The circuit for full search block matching according to the present invention will be described in greater detail with reference to FIGS. 4 through 6.

The address generator 460 transmits the first address signal AD1 to the reference block memory 410 to output the reference block pixel data R of the reference block. The address generator 460 transmits the second address signal AD2 to the search block memory 420 to output the candidate block pixel data S1 and S2 of a plurality of pixels composing each candidate block in the search window.

The reference block pixel data R and the candidate block pixel data S1 and S2 are input to the PE unit 430. In the PE unit 430, absolute differences between the reference pixel data R through $R_N$ and the candidate block pixel data S1 or S2 are calculated, the absolute differences for each pixel data are accumulated, and the resulting accumulated absolute differences, i.e., AAD0 through AAD(N+1), are transmitted to the comparison unit 440.

The comparison unit 440 compares a predetermined minimum AAD value with each of the AAD values AAD0 through AAD(N+1). If the minimum AAD value is greater than an AAD value, the corresponding control signal C0 through C(N+1) remains enabled. In contrast, if the minimum AAD value is smaller than an AAD value, the comparison unit 440 disables the corresponding control signal C0 through C(N+1) to stop the operation of the corresponding PE since there is no reason to calculate the AAD value. The comparator 440 generating a disabled control signal and the PE receiving the disabled control signal stop their operations. By doing so, unnecessary computations are not performed, thereby saving time and power.

After computation for one stage comprising a plurality of candidate blocks is complete, computation is performed on the next stage. If a current AAD value smaller than the minimum AAD value $AAD_{min}$ is generated during computation, the minimum AAD value $AAD_{min}$ is updated by the current AAD value smaller than the minimum AAD value.

If all of the control signals C0 through C(N+1) are disabled, the logic circuit 450 detects that the control signals C0 through C(N+1) have been disabled, transmits an address skip signal A/S to the address generator 460 to address the next stage for computation.

Figure 7:
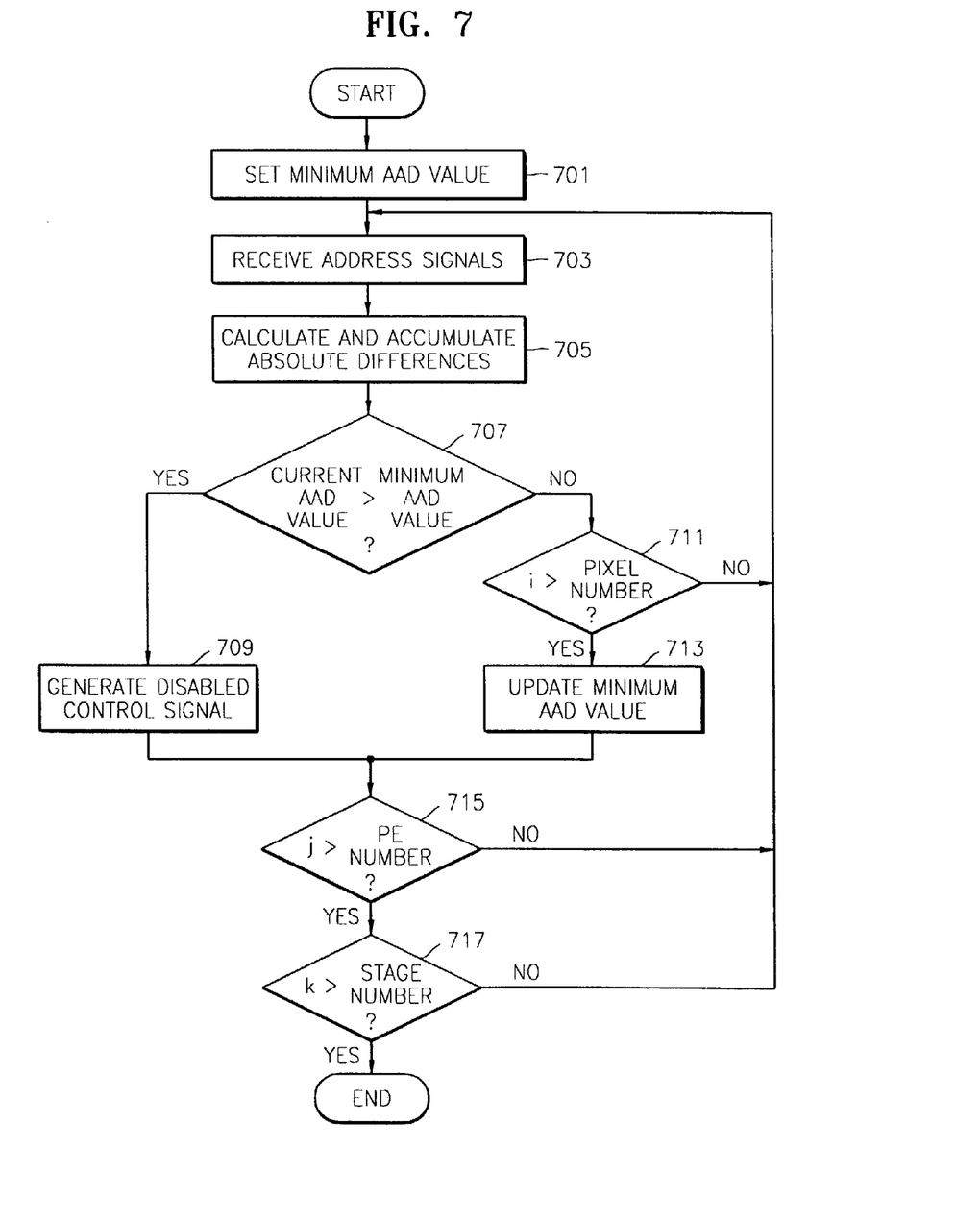
FIG. 7 is a flowchart illustrating a method for full search block matching according to an embodiment of the present invention.

FIG. 7 is a flowchart illustrating a method for full search block matching according to the present invention. Referring to FIG. 7, the method for full search block matching, in which the degree of matching of a plurality of candidate blocks in a predetermined search window with a reference block is calculated by parallel operation, involves setting an minimum AAD value (step 701). A first address signal AD1 for the reference block memory 410 (see FIG. 4) storing the reference block pixel data and a second address signal AD2 for the search window memory 420 storing the candidate block pixel data are received (Step 703). A reference block pixel data stored at a first address of the reference block memory 410 and a corresponding reference block pixel data stored at a second address of the candidate window memory 420 are received according to the first and second address signals, respectively, and absolute differences between the reference block pixel data and the candidate block pixel data are calculated and then accumulated for each pixel data (Step 705).

AAD values are compared with the minimum AAD value (Step 707). If an AAD value is greater than the minimum AAD value, a disabled control signal is generated to stop performing computation for the corresponding candidate block (Step 709). In contrast, if an AAD value is smaller than the minimum AAD value, it is determined whether the reference block pixel data currently read from the reference block memory is the last reference block pixel data, or whether the candidate block pixel data currently read from the search window memory is the last candidate block pixel data (Step 711). If the currently read reference block pixel data and candidate block pixel data are not the last pixel data, the process returns to Step 703 to receive the next reference block pixel data and the next candidate block pixel data. If it is determined in Step 711 that the currently read reference block pixel data and candidate block pixel data are the last pixel data, the predetermined minimum AAD value is updated by the current AAD value used in Step 701 (Step 713).

Next, it is determined whether computation is performed on all of the candidate blocks comprising one stage through Steps 703 through 713 (Step 715). If the computation from Step 703 to Step 713 is not performed on all of the candidate blocks, Steps 703 through 713 are performed on the next candidate block of the stage.

If it is determined in Step 715 that the computation is performed on all of the candidate blocks of one stage, it is determined whether the current stage is the last one among a plurality of stages to be searched, each of the stages comprising a plurality of candidate blocks. If the computation is not performed on the last candidate block of the last stage, Steps 703 through 713 are performed.

If it is determined in Step 717 that the computation is performed on the last candidate block of the last stage, the overall process is terminated.

FIG. 8 shows a conventional timetable applied to compute 17 distortions using 17 PEs. In FIG. 8, reference pixel data $r_{i,j}$, and candidate pixel data $s_{i,j}$ input to 17 PEs are represented for each cycle time. The reference pixel data $r_{i,j}$ and the candidate pixel data $s_{i,j}$ are sequentially input on a row basis, starting from the PE0 on the left toward the PE16 on the right of the timetable.

The result of the computation by the PE0 is expressed as D(i,0). The result of the computation by the PE1 is expressed as D(i,1), and that by the PE16 is expressed as D(i,16). Here, i is an integer from 0 to 16 and is equal to the number of stages. The reference block pixel data is delayed by the D flip-flop of each of the PEs by a predetermined period of time and then transmitted to the next PE.

Denoting an accumulate register which stores the AAD value calculated by an accumulator, such as the accumulator 540 of FIG. 5, as $acc_j$, the accumulate register $acc_0$ of the PE0 stores $acc_0=|r_{0,0}-s_{0,0}|$ at t=0. At t=0, no computation is performed by the other PEs. At t=1, the accumulate register $acc_0$ of the PE0 stores $acc_0=acc_0+|r_{0,1}-s_{1,1}|$, and the accumulate register $acc_1$ of the PE1 stores $acc_1=|r_{0,0}\ _{-s0,1}|$. At t=16, the second stage (i.e., second row) of the search window starts to be calculated, and the reference block pixel data $r_{0,0}$ is input to the last PE, i.e., PE16, so that all of the PEs operate for computation. At this time, the accumulate register $acc_0$ of the PE0 stores $acc_0=acc_0+|r_{1,0}-s_{1,0}|$, and the accumulate register $acc_j$ of each of the PE1 through PE16 stores $acc_j=acc_j+|r_{0,16-j}-s_{0,16}|$, where j is an integer from 1 to 16.

At t=255, the last pixel data of the reference block is input so that the first AAD value and $D_{0,0}$ are obtained. Following this, the $2^{nd}$ through $17^{th}$ AAD values and $D_{0,1}$, $D_{0,2}$, ..., and $D_{0,16}$ are sequentially obtained, one per clock cycle, by the respective PE1 through PE16. Therefore, as shown in FIG. 8, a total of 17 AAD values are obtained after 272 clock cycles.

FIG. 9 shows a timetable applied to compute 17 distortions using 17 PEs according to the present invention. As shown in FIG. 9, at t=256, AAD calculation for another stage following the previous stage is started to obtain $D_{1,0}$, $D_{1,1}$, ..., and $D_{1,16}$. To calculate a motion vector for one block, a total of 289 processes by the PEs are required. 289 AAD values are obtained through 4248 (=17×(16×16)+16) clock cycles.

If an SIF image (352×240) having 330 (22×15) macro blocks in each frame is processed, a number of computations is required to process 30 frames per 1 second. According to the present invention, the PEs can independently perform parallel calculations for each frame or macro block.

As shown in FIG. 4, when the AAD value accumulated by each PE is greater than the minimum AAD value, the corresponding PE no longer performs computation from that time. Therefore, power consumption can be reduced by not performing unnecessary computations. In addition, if all of the PEs in each stage are inactivated, the matching operation on the corresponding stage is skipped, and the process goes onto the next stage, thereby reducing processing time.

Macro blocks in a frame have similar motion vectors. In particular, in a PAN or ZOOM image, most macro blocks have similar motion vectors. For fast motion estimation, it is preferable to set an initial minimum AAD value by processing a search window corresponding to the motion vector of the previous macro block first.

As described above, the circuit and method for full search block matching according to the present invention can considerably reduce the number of computations so that the motion vector can be calculated quickly and power consumption can be reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A circuit for full matching a plurality of candidate blocks in a search window with a reference block, the circuit comprising:
   an address generator which generates a first address signal and a second address signal according to an address skip signal;
   a reference block memory which stores a plurality of reference block pixel data composing the reference block and outputs the reference block pixel data that are stored in response to the first address signal;
   a search window memory which stores a plurality of candidate block pixel data in two separate sub-regions of the search window memory and outputs the candidate block pixel data that are stored from each of the sub-regions in response to the second address signal;
   a processor element unit including a plurality of processor elements, each of said processor elements receiving a control signal, the reference block pixel data, and the candidate block pixel data and calculating and accumulating absolute differences between the reference block pixel data and the corresponding candidate block pixel data to output an accumulated absolute difference (AAD) value for all of the reference block pixel data;
   a comparison unit which receives a predetermined minimum AAD value and the AAD values sequentially output from the processor element unit, compares the minimum AAD value with each of the AAD values and outputs the control signal for each of the processor elements, the control signal being disabled when the AAD value is greater than the minimum AAD value, said control signal controlling whether to enable or disable the corresponding processor element performing AAD value computation; and
   a logic circuit which receives the control signals and outputs the address skip signal according to the logic state of the control signals.

2. The circuit of claim 1, wherein the address skip signal is enabled when all of the control signals are disabled.

3. The circuit of claim 1, wherein the minimum AAD value is the least AAD value among AAD values calculated by an arbitrary processor element of the processor element unit and is continuously updated while computation is performed in the PE unit.

4. The circuit of claim 1, wherein:
   the processor unit comprises a plurality of processor elements of a first type and a single processor element of a second type, the plurality of processor elements of the first type being connected in series with the processor element of the second type at an end;
   the first leading processor element of the first type receives the reference block pixel data, the candidate block pixel data, and a first control signal among the control signals, outputs first delayed reference block pixel data delayed by a predetermined period of time with respect to the receive block pixel data, and calculates and accumulates absolute differences between the reference block pixel data and the corresponding candidate block pixel data according to the first control signal to output a first AAD value for all of the pixel data of one candidate block corresponding to the reference block;
   the second leading processor element of the first type receives the first delay reference block pixel data, the reference block pixel data, and a second control signal among the control signals, outputs second delayed reference block pixel data delayed by a predetermined period of time with respect to the first delay reference block pixel data, and calculates and accumulates absolute differences between the first delayed reference block pixel data and the corresponding candidate block pixel data according to the second control signal to output a second AAD value for all of the pixel data of another candidate block corresponding to the reference block;
   the Nth processor element of the first type receives (N−1)th delay reference block pixel data, the candidate block pixel data, and an Nth control signal among the control signals, outputs Nth delayed reference block pixel data delayed by a predetermined period of time with respect to the (N−1)th delay reference block pixel data, and calculates and accumulates absolute differences between the (N−1)th delayed reference block pixel data and the corresponding candidate block pixel data according to the Nth control signal to output an Nth AAD value for all of the pixel data of another candidate block corresponding to the reference block; and
   the last processor element of the second type receives the Nth delay reference block pixel data, the candidate block pixel data, and an (N+1)th control signal among the control signals, and calculates and accumulates absolute differences between the Nth delayed reference block pixel data and the corresponding candidate block pixel data according to the (N+1)th control signal to output an (N+1)th AAD value for all of the pixel data of another candidate block corresponding to the reference block.

5. The circuit of claim 4, wherein each of the processor elements of the first type comprises:
   a D flip-flop which receives at least one of the reference block pixel data and the delayed reference block pixel data delayed by a predetermined period of time with respect to the reference block pixel data;
   a multiplexer which selectively outputs the candidate block pixel data of one of the sub-regions;
   an absolute difference calculator which calculates absolute differences between at least one of the reference block pixel data and the delayed reference block pixel data and the output data of the multiplxer; and
   an accumulator which accumulates the output data of the absolute difference calculator until the absolute differences for all of the pixels of one candidate block corresponding to the reference block are received, and outputs one of the first through Nth AAD values, and
   the processor element of the second type comprises:
   a multiplexer which selectively outputs the candidate block pixel data of one of the sub-regions;
   an absolute difference calculator which calculates absolute differences between the reference block pixel data and the output data of the multiplxer; and
   an accumulator which accumulates the output data of the absolute difference calculator until the absolute differences for all of the pixel date of one candidate block corresponding to the reference block are received, and outputs the (N+1)th AAD value, wherein the multiplexer, the absolute difference calculator, and the accumulator of each of the processor elements are controlled by one of the first through (N+1)th control signals.

6. The circuit of claim 1, wherein the comparison unit comprises:
   a first comparator which receives and compares the minimum AAD value and the first AAD value, and disables the first control signal if the first AAD value is greater than the minimum AAD value;
   a second comparator which receives and compares the minimum AAD value and the second AAD value, and disables the second control signal if the second AAD value is greater than the minimum AAD value; and
   a (N+1)th comparator which receives and compares the minimum AAD value and the (N+1)th AAD value, and disables the (N+1)th control signal if the (N+1)th AAD value is greater than the AAD value,
   wherein the first through (N+1)th comparators no longer perform comparisons if the corresponding first through (N+1)th comparators are disabled.

7. A method for full matching a plurality of candidate blocks in a search window with a reference block by parallel operation, the method comprising:
   (a) setting a minimum accumulated absolute difference (AAD) value;
   (b) calculating and accumulating absolute differences between a plurality of reference block pixel data composing the reference block and corresponding candidate block pixel data composing one candidate block, terminating the absolute difference calculation and accumulation for the candidate block if a current AAD value is greater than the minimum AAD value, and updating the minimum AAD value by a calculated AAD value if the AAD value calculated for all of the pixel data of the candidate block is smaller than the minimum AAD value;
   (c) determining whether step (b) is performed on all candidate blocks composing one stage, and performing step (b) on the next candidate block of the stage if step (b) is not performed on all of the candidate blocks of the stage;
   (d) if it is determined in step (c) that step (b) is performed on all of the candidate blocks of the stage, determining whether step (b) is performed on all stages to be searched, each of the stages comprising a plurality of candidate pixels, and performing step (b) if step (b) is not performed on the last candidate block of the last stage; and
   (e) if it is determined in step (d) that step (b) is performed on the last candidate block of the laststage, terminating the overall process.

8. The method of claim 7, wherein step (b) comprises:
   (b1) receiving a first address signal for a reference block memory storing the reference block pixel data and a second address signal for a search window memory storing the candidate block pixel data;
   (b2) receiving the reference pixel data stored at a first address of the reference block memory and the candidate block pixel data stored at a second address of the search window memory according to the first and second address signals, respectively, and calculating and accumulating absolute differences between the reference pixel data and the corresponding candidate pixel data;
   (b3) comparing the minimum AAD value and a currently accumulated absolute difference (AAD) value;
   (b4) if the current AAD value is greater than the minimum AAD value, terminating step (b) on the corresponding candidate block;
   (b5) if the current AAD value is smaller than the minimum AAD value, determining whether the reference block pixel data currently read from the reference block memory is the last reference block pixel data, or whether the candidate block pixel data currently read from the search window memory is the last candidate block pixel data, and receiving the next reference block pixel data and the next candidate block pixel data if the currently read reference block pixel data and candidate block pixel data are not the last pixel data; and
   (b6) if it is determined in step (b5) that the currently read reference block pixel data and candidate block pixel data are the last pixel data, updating the minimum AAD value by the AAD value used in step (b5).

* * * * *